United States Patent
Omote et al.

(10) Patent No.: US 11,255,717 B2
(45) Date of Patent: Feb. 22, 2022

(54) VIBRATION DETECTING ARRANGEMENT FOR REDUCING RESONANT NOISE

(71) Applicants: KABUSHIKI KAISHA TOSHIBA, Minato-ku (JP); TOSHIBA ELECTRONIC DEVICES & STORAGE CORPORATION, Minato-ku (JP)

(72) Inventors: Hirofumi Omote, Adachi (JP); Hiroshi Ota, Misato (JP); Ryoji Ninomiya, Kunitachi (JP); Yousuke Hisakuni, Sagamihara (JP)

(73) Assignees: KABUSHIKI KAISHA TOSHIBA, Minato-ku (JP); TOSHIBA ELECTRONIC DEVICES & STORAGE CORPORATION, Minato-ku (JP)

( * ) Notice: Subject to any disclaimer, the term of this patent is extended or adjusted under 35 U.S.C. 154(b) by 188 days.

(21) Appl. No.: 16/563,662

(22) Filed: Sep. 6, 2019

(65) Prior Publication Data
US 2020/0378823 A1    Dec. 3, 2020

(30) Foreign Application Priority Data

May 31, 2019    (JP) .............................. JP2019-103079

(51) Int. Cl.
*G01H 1/12*    (2006.01)
*G01H 11/06*    (2006.01)
*G01H 11/02*    (2006.01)

(52) U.S. Cl.
CPC ............... *G01H 1/12* (2013.01); *G01H 11/02* (2013.01); *G01H 11/06* (2013.01)

(58) Field of Classification Search
CPC .......... G01H 1/12; G01H 11/02; G01H 11/06; G01N 29/2462; G01N 29/2468
See application file for complete search history.

(56) References Cited

U.S. PATENT DOCUMENTS

| 5,866,818 A * | 2/1999 | Sumi ....................... G01P 15/02 73/514.33 |
| 2005/0155429 A1* | 7/2005 | Griessler ............. G01M 13/045 73/593 |

(Continued)

FOREIGN PATENT DOCUMENTS

| JP | 06265569 A * | 9/1994 |
| JP | 2004053501 A * | 2/2004 |

(Continued)

OTHER PUBLICATIONS

Machine Translation of JP2004344338A (Year: 2021).*

*Primary Examiner* — David L Singer
(74) *Attorney, Agent, or Firm* — Oblon, McClelland, Maier & Neustadt, L.L.P.

(57) ABSTRACT

According to one embodiment, a vibration detecting device includes a housing, a vibration sensor in the housing, a circuit board in the housing, a flexible wiring component, a first face, and a second face. The vibration sensor is housed in the housing. An electric component that processes a detection signal of the vibration sensor is provided on the circuit board. The wiring component electrically connects the vibration sensor and the circuit board. The first face is provided on the housing and is configured to be attached to an object. The second face is provided inside the housing and is inclined with respect to the first face, the vibration sensor being attached thereto.

17 Claims, 10 Drawing Sheets

(56) References Cited

U.S. PATENT DOCUMENTS

| | | | | |
|---|---|---|---|---|
| 2010/0046576 A1* | 2/2010 | Desai | ............... | G01N 29/2487 |
| | | | | 374/119 |
| 2015/0324014 A1* | 11/2015 | Liao | ............... | G06F 3/0346 |
| | | | | 345/156 |
| 2017/0034827 A1 | 2/2017 | Naiki et al. | | |
| 2018/0112601 A1* | 4/2018 | Li | ............... | F01D 25/04 |
| 2019/0101420 A1* | 4/2019 | Ninomiya | ............... | H05K 5/0008 |
| 2020/0408594 A1* | 12/2020 | Omote | ............... | H05K 1/0277 |

FOREIGN PATENT DOCUMENTS

| | | | |
|---|---|---|---|
| JP | 2004344338 A | * | 12/2004 |
| JP | 2017-32275 A | | 2/2017 |
| JP | 6111858 B2 | | 4/2017 |
| JP | 6327065 B2 | | 5/2018 |
| JP | 2020-38137 A | | 3/2020 |
| WO | WO 2017/183708 A1 | | 10/2017 |

* cited by examiner

VIBRATION DETECTING ARRANGEMENT FOR REDUCING RESONANT NOISE

CROSS-REFERENCE TO RELATED APPLICATIONS

This application is based upon and claims the benefit of priority from Japanese Patent Application No. 2019-103079, filed on May 31, 2019; the entire contents of which are incorporated herein by reference.

FIELD

Embodiments described herein relate generally to a vibration detecting device.

BACKGROUND

A device including a vibration sensor has been known, the vibration sensor attached to an object, the device detecting vibration with the vibration sensor.

DETAILED DESCRIPTION

According to one embodiment, a vibration detecting device includes a housing, a vibration sensor in the housing, the circuit board in the housing, a flexible wiring component, a first face, and a second face. An electric component that processes a detection signal of the vibration sensor is provided on the circuit board. The flexible wiring component electrically connects the vibration sensor and the circuit board. The first face is provided on the housing, the first face configured to be attached to an object. The second face is provided inside the housing and is inclined with respect to the first face, the second face to which the vibration sensor is attached.

First Embodiment

In the following, the first embodiment will be described with reference to FIG. 1 to FIG. 9. Note that there is a case where a configuration element according to an embodiment and a description of the element are described in a plurality of kinds of expression in the present description. A configuration element and a description thereof are examples and are not limited by an expression in the present description. A configuration element may be specified by a name different from that in the present description. A configuration element may be described by expression different from expression in the present description.

Figure 1:
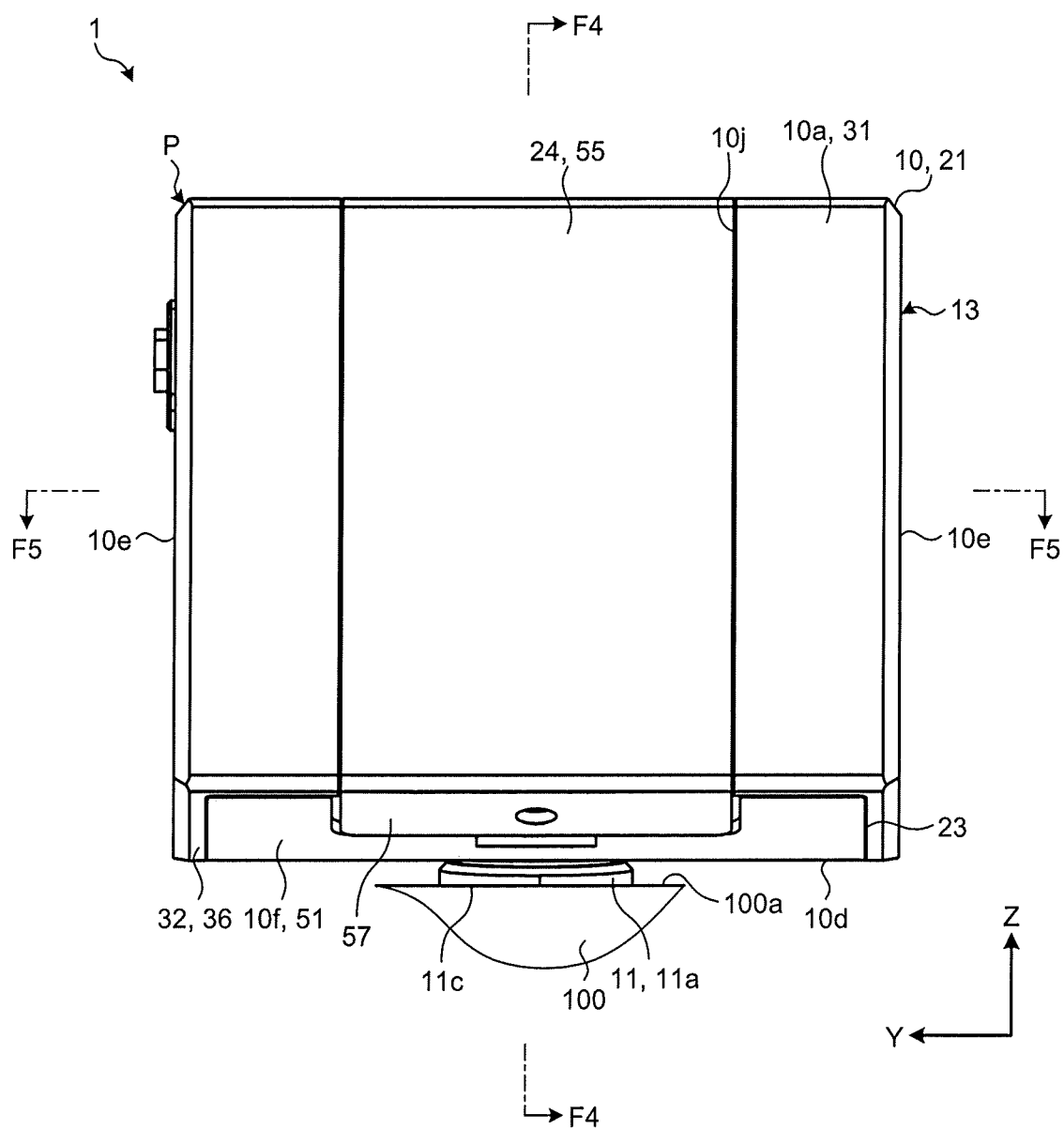
FIG. 1 is an exemplary front view illustrating a vibration detecting device according to a first embodiment.
Figure 2:
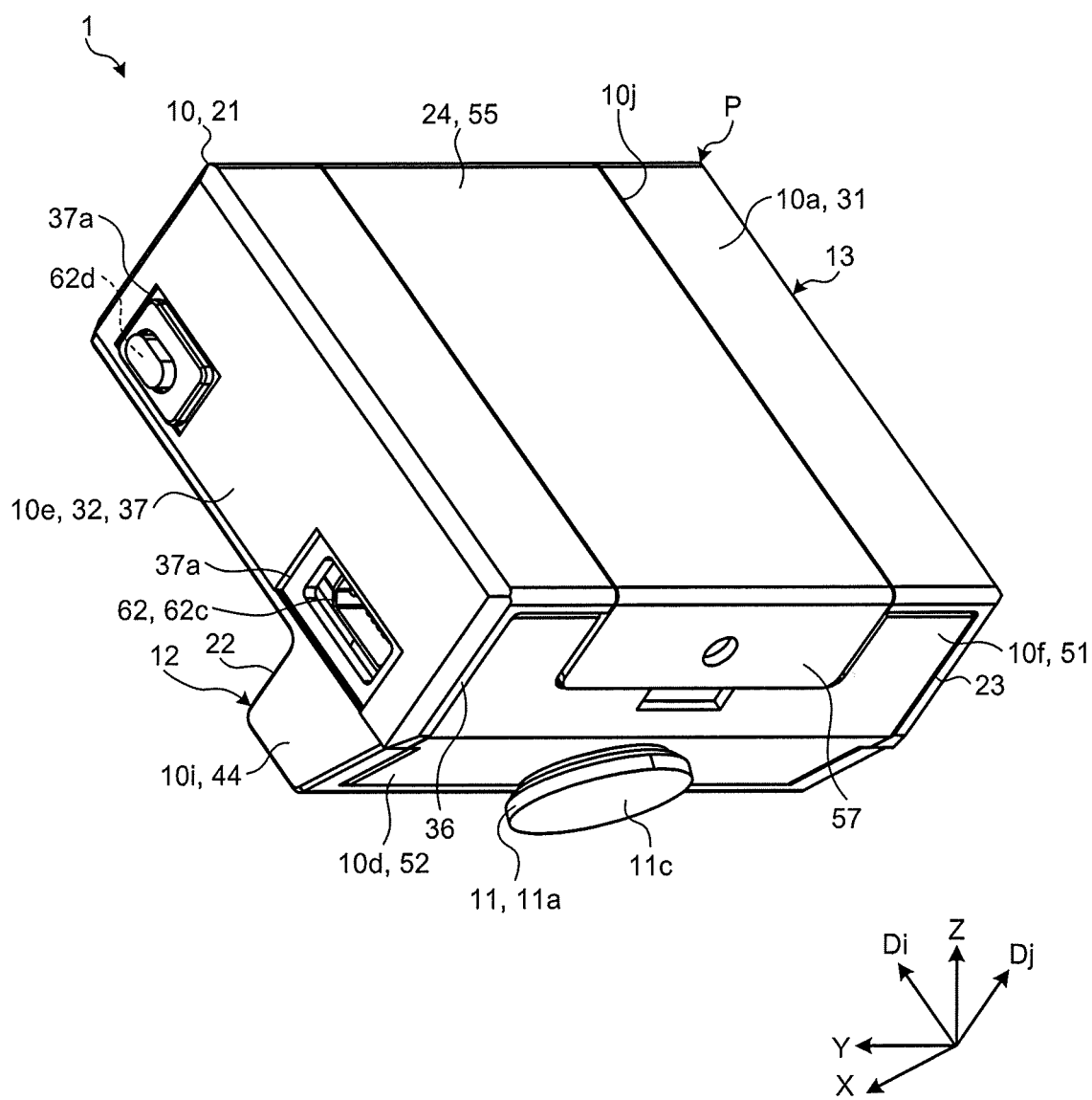
FIG. 2 is an exemplary perspective view illustrating the vibration detecting device in the first embodiment.
Figure 3:
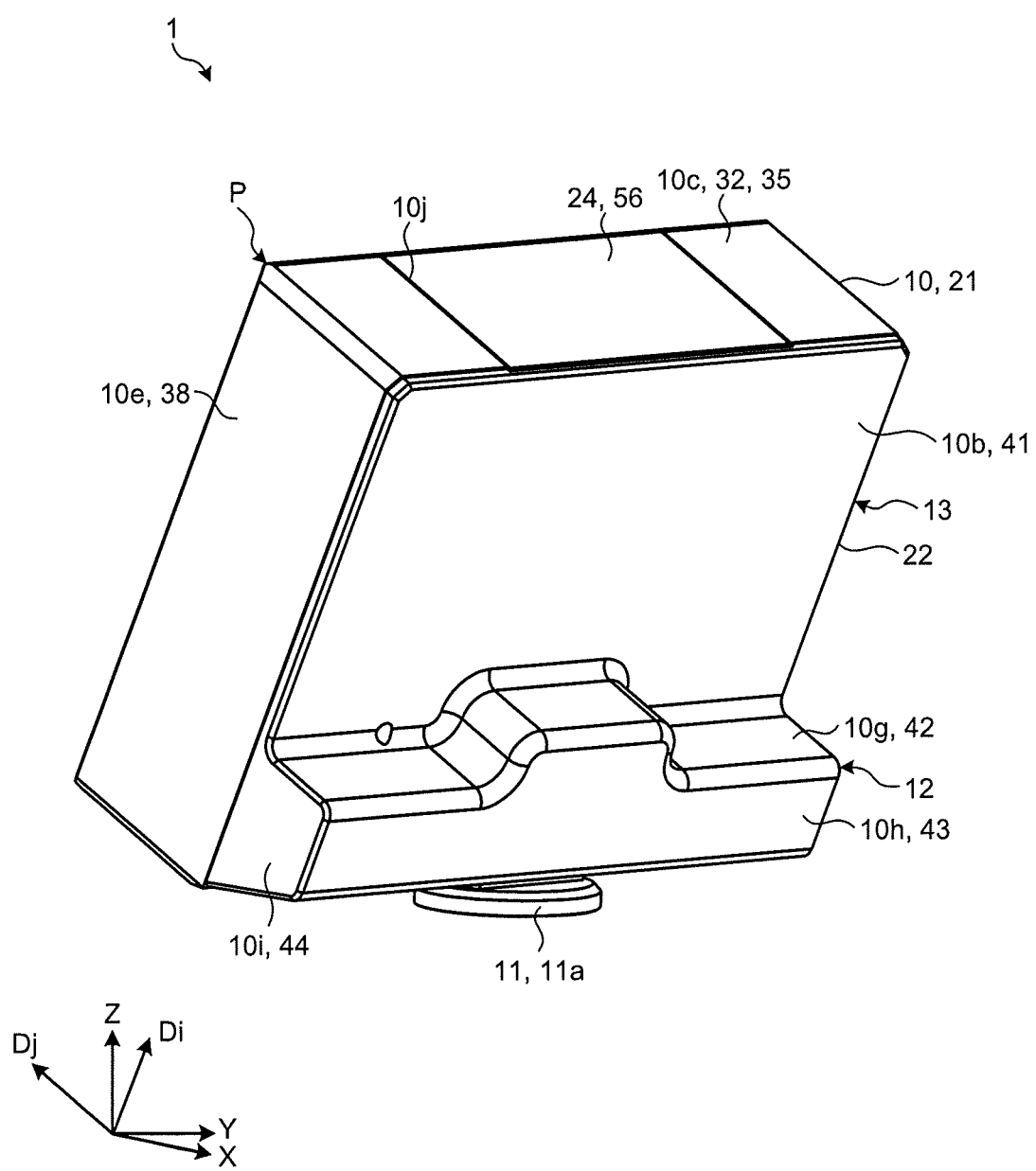
FIG. 3 is an exemplary perspective view illustrating the vibration detecting device from an angle different from that of FIG. 2, in the first embodiment.

FIG. 1 is an exemplary front view illustrating a vibration detecting device 1 according to the first embodiment. FIG. 2 is an exemplary perspective view illustrating the vibration detecting device 1 in the first embodiment. FIG. 3 is an exemplary perspective view illustrating the vibration detecting device 1 from an angle different from that in FIG. 2, in the first embodiment.

As illustrated in FIG. 1, the vibration detecting device 1 is attached to a surface 100*a* of an object 100. The vibration detecting device 1 detects a vibration of the object 100, for example. As illustrated in FIG. 1 to FIG. 3, the vibration detecting device 1 includes a housing 10. The housing 10 includes an attachment 11, a base portion 12, and a protruded portion 13.

As illustrated in each drawing, an X-axis, a Y-axis, and a Z-axis are defined for convenience in the present description. The X-axis, the Y-axis, and the Z-axis are orthogonal to each other. The X-axis is provided along a depth of the vibration detecting device 1. The Y-axis is provided along a width of the vibration detecting device 1. The Z-axis is provided along a height of the vibration detecting device 1.

Moreover, an X direction, a Y direction, and a Z direction are defined in the present description. The X direction is a direction along the X-axis, and includes a +X direction indicated by an arrow of the X-axis and a −X direction that is an opposite direction of the arrow of the X-axis. The Y direction is a direction along the Y-axis, and includes a +Y direction indicated by an arrow of the Y-axis and −Y direction that is an opposite direction of the arrow of the Y-axis. The Z direction is a direction along the Z-axis, and includes a +Z direction indicated by an arrow of the Z-axis and a −Z direction that is an opposite direction of the arrow of the Z-axis.

A Di direction and a Dj direction are defined in the present description. The Di direction, the Dj direction, and the Y direction are orthogonal to each other. The Di direction is a direction, in which the protruded portion 13 is extended, and includes a +Di direction indicated by an arrow Di and a −Di direction that is an opposite direction of the arrow Di. The Dj direction is a thickness direction of the protruded portion 13 and is a direction orthogonal to the Di direction. The Dj direction includes a +Dj direction indicated by an arrow Dj and a −Dj direction that is an opposite direction of the arrow Dj.

In the present embodiment, the surface 100*a* of the object 100 is a substantially flat face that is orthogonal to the Z-axis and that faces the +Z direction. However, the surface 100*a* is not limited to this example. For example, a vibration detecting device 1 may be attached to a curved surface 100*a*.

In an example of each drawing, the +Z direction is a vertically upper side, the −Z direction is a vertically lower side, and the X direction and the Y direction are horizontal directions. However, the X direction, the Y direction, and the Z direction are not limited to this example. For example, a vibration detecting device 1 may be attached to a surface 100*a* that faces a vertically lower side, a horizontal direction, or a different direction. That is, positions and directions of the vibration detecting device 1, and the surface 100*a* of the object 100 to which the vibration detecting device 1 is attached are not limited, and may be various positions and directions.

Figure 4:
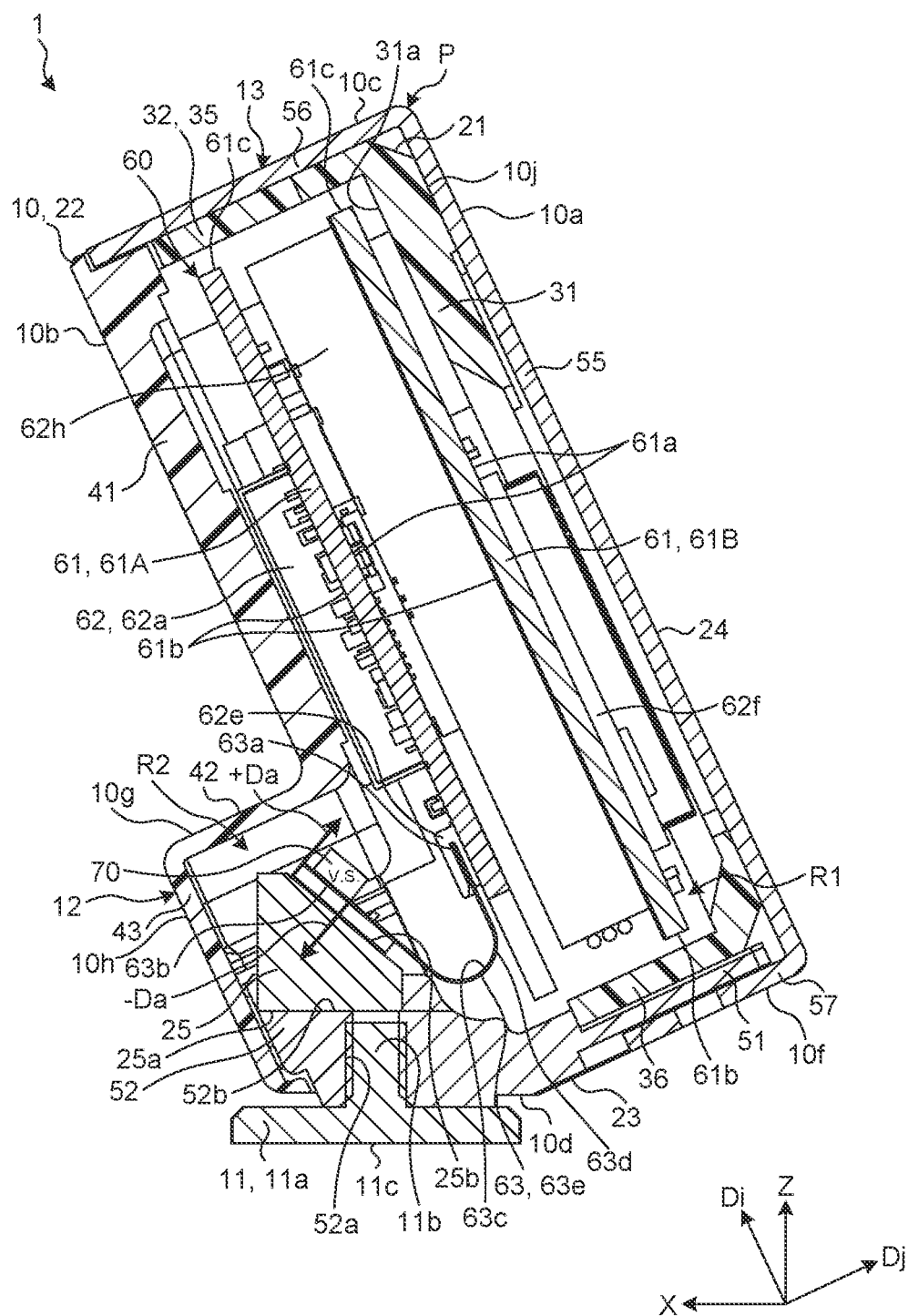
FIG. 4 is an exemplary sectional view illustrating the vibration detecting device along an F4-F4 line in FIG. 1, in the first embodiment.

FIG. 4 is an exemplary sectional view illustrating the vibration detecting device 1 along an F4-F4 in FIG. 1, of the first embodiment. As illustrated in FIG. 4, the attachment 11 has a fixed portion 11a and a male screw portion 11b.

As illustrated in FIG. 1, the fixed portion 11a is substantially disk-shaped, and is fixed to the surface 100a of the object 100. The fixed portion 11a has a substantially flat attachment face 11c that is orthogonal to the Z direction and that faces the −Z direction. The attachment face 11c is one example of a first face. The attachment face 11c forms a part of an outer face of the housing 10 and faces the outside of the housing 10. In other words, the attachment face 11c is provided on the housing 10.

The attachment face 11c is attached to the surface 100a of the object 100, for example, with adhesive or the like. With this arrangement, the attachment 11 and therefore the vibration detecting device 1 are fixed to the object 100. Note that an outer face of the base portion 12 or the protruded portion 13 may be attached to the surface 100a of the object 100 as an example of the first face. The attachment 11 may be also referred to as a bracket. As illustrated in FIG. 4, the male screw portion 11b is protruded in the +Z direction from the fixed portion 11a.

The base portion 12 is detachably connected to the attachment 11. The base portion 12 is protruded in the +X direction from an end portion in the −Di direction of the protruded portion 13. In other words, the protruded portion 13 is protruded in the +Di direction from an end portion in the −X direction of the base portion 12.

As one, the base portion 12 and the protruded portion 13 substantially have an L shape or a V shape. The Di direction is inclined obliquely with respect to the Z direction. For example, an angle between the Z direction and the Di direction is an acute angle. Thus, the protruded portion 13 is extended obliquely from the base portion 12 in the Z direction faced by the attachment face 11c.

The protruded portion 13 is formed in a flat cuboid shape. For example, a length (width) of the protruded portion 13 in the Y direction is substantially constant. A length (thickness) of the protruded portion 13 in the Dj direction is substantially constant. Note that a shape of the protruded portion 13 is not limited to this example.

As illustrated in FIG. 1 to FIG. 4, the housing 10 has a front face 10a, a rear face 10b, a top face 10c, a bottom face 10d, a side face 10e, a front lower face 10f, a rear upper face 10g, a rear end face 10h, and a rear side face 10i that are outer faces of the housing 10. Note that in the present description, expression expressing directions such as front, rear, upper, lower, top, bottom, and side is used for convenience on the basis of each drawing and is not to limit a position and a direction of each element. For example, a top face 10c may be placed on a vertically lower side of a bottom face 10d.

The front face 10a is a face that is placed in an end portion in the +Dj direction of the protruded portion 13 and that is substantially orthogonal to the Dj direction. The rear face 10b is a face that is placed in an end portion in the −Dj direction of the protruded portion 13 and that is substantially orthogonal to the Dj direction.

The top face 10c is a face that is placed in an end portion in the +Di direction of the protruded portion 13 and that is substantially orthogonal to the Di direction. The bottom face 10d is a face that is placed in an end portion in the −Z direction of the base portion 12 and that is substantially orthogonal to the Z direction. The bottom face 10d is substantially in parallel with the surface 100a of the object 100 and the attachment face 11c of the attachment 11. The bottom face 10d may be attached to the surface 100a of the object 100 instead of the attachment face 11c of the attachment 11.

The side face 10e is a face that is placed in each end portion in the Y direction of the protruded portion 13 and that is substantially orthogonal to the Y direction. The front lower face 10f is a face that is placed in the end portion in the −Di direction of the protruded portion 13 and that is substantially orthogonal to the Di direction.

The rear upper face 10g is a face that is placed in an end portion in the +Di direction of the base portion 12 and that is substantially orthogonal to the Di direction. The rear end face 10h is a face that is placed in an end portion in the −Dj direction of the base portion 12 and that is substantially orthogonal to the Dj direction. The rear side face 10i is a face that is placed in each end portion in the Y direction of the base portion 12 and that is substantially orthogonal to the Y direction.

The housing 10 includes a front case 21, a back cover 22, a bottom frame 23, a shield 24, and a spacer 25. The spacer 25 is one example of a second component. The front case 21, the back cover 22, the bottom frame 23, and the shield 24 form the base portion 12 and the protruded portion 13.

The front case 21 and the back cover 22 are formed of a material that has electromagnetic wave transmittance and that is, for example, a synthetic resin material or elastomer. On the one hand, the bottom frame 23, the shield 24, and the spacer 25 are formed of a metal material that has an electromagnetic wave shielding property and that is, for example, an aluminum alloy (aluminum-based material), stainless steel (iron-based material), or a magnesium alloy (magnesium-based material). Note that materials of the front case 21, the back cover 22, the bottom frame 23, the shield 24, and the spacer 25 are not limited to this example.

The front case 21 has a front wall 31 and a peripheral wall 32. The front wall 31 is substantially orthogonal to the Dj direction and forms a part of the front face 10a of the housing 10. The front wall 31 has a substantially flat inner face 31a facing the −Dj direction. The peripheral wall 32 is formed in a substantially quadrangular frame shape and is protruded in the −Dj direction from the inner face 31a. The peripheral wall 32 has an upper wall 35, a lower wall 36, a left wall 37, and a right wall 38.

The upper wall 35 is protruded from an end portion in the +Di direction of the inner face 31a. The upper wall 35 is substantially orthogonal to the Di direction and forms a part of the top face 10c of the housing 10. The lower wall 36 is protruded from an end portion in the −Di direction of the inner face 31a. The lower wall 36 is substantially orthogonal to the Di direction and forms a part of the front lower face 10f. That is, the lower wall 36 is separated from the upper wall 35 in the −Di direction along the inner face 31a.

The left wall 37 is protruded from an end portion in the +Y direction of the inner face 31a. The left wall 37 is substantially orthogonal to the Y direction and forms one side face 10e of the housing 10. The right wall 38 is protruded from an end portion in the −Y direction of the inner face 31a. The right wall 38 is substantially orthogonal to the Y direction and forms the other side face 10e of the housing 10. That is, the right wall 38 is separated from the left wall 37 in the −Y direction along the inner face 31a. The left wall 37 and the right wall 38 connect both ends in the Y direction of the upper wall 35 and both ends in the Y direction of the lower wall 36.

Lengths (protrusion amount) in the Dj direction of the upper wall 35, the left wall 37, and the right wall 38 are substantially equal. A length in the Dj direction of the lower wall 36 is shorter than a length in the Dj direction of each of the upper wall 35, the left wall 37, and the right wall 38. Note that lengths of the upper wall 35, the lower wall 36, the left wall 37, and the right wall 38 may be identical or different from each other.

As described above, the front case 21 is formed in a box shape with an end portion in the −Dj direction being opened. Thus, a first housing chamber R1 is provided inside the front case 21. The first housing chamber R1 is a space formed (prescribed) by the front wall 31 and the peripheral wall 32.

As illustrated in FIG. 2, a plurality of openings 37a is provided in the left wall 37 of the front case 21. Each of the openings 37a is a hole penetrating the left wall 37, and communicates the first housing chamber R1 and the outside of the housing 10. Note that the opening 37a is not limited to a hole and may be a notch, for example.

As illustrated in FIG. 3, the back cover 22 has a rear wall 41, a rear upper wall 42, a rear end wall 43, and a rear side wall 44. The rear wall 41 is substantially orthogonal to the Dj direction, and forms the rear face 10b of the housing 10. The rear upper wall 42 is protruded in the −Dj direction from an end portion in the −Di direction of the rear wall 41. The rear upper wall 42 is substantially orthogonal to the Di direction and forms the rear upper face 10g. The rear end wall 43 is protruded in the −Di direction from an end portion of the rear upper wall 42 in the −Dj direction. The rear end wall 43 is substantially orthogonal to the Dj direction and forms the rear end face 10h. The rear side wall 44 is connected to each end in the Y direction of the rear upper wall 42 and the rear end wall 43. The rear side wall 44 is substantially orthogonal to the Y direction and forms the rear side face 10i.

The back cover 22 is attached to an end portion in the −Dj direction of the peripheral wall 32, for example, with an adhesive. With this arrangement, the back cover 22 covers the first housing chamber R1 inside the front case 21.

As illustrated in FIG. 4, the rear upper wall 42, the rear end wall 43, and the rear side wall 44 of the back cover 22 are formed in a box shape with end portions in the +Dj direction and the −Z direction being opened. Thus, a second housing chamber R2 is provided inside the back cover 22. The second housing chamber R2 is a space formed (prescribed) by the rear upper wall 42, the rear end wall 43, and the rear side wall 44. The second housing chamber R2 communicates with an end portion in the −Di direction of the first housing chamber R1.

The bottom frame 23 has a front lower wall 51 and a bottom wall 52. The front lower wall 51 is substantially orthogonal to the Di direction and forms a part of the front lower face 10f of the housing 10. The bottom wall 52 is protruded in the +X direction from an end portion in the −Dj direction of the front lower wall 51. The bottom wall 52 is substantially orthogonal to the Z direction and forms the bottom face 10d. A female screw portion 52a to which the male screw portion 11b of the attachment 11 is detachably attached is provided in the bottom wall 52.

The bottom wall 52 has an installation face 52b. The installation face 52b forms a part of an inner face of the housing 10. The installation face 52b faces an inner side of the second housing chamber R2 provided inside the housing 10. The installation face 52b is orthogonal to the Z-axis and faces the +Z direction. Note that the installation face 52b may face a different direction.

The front lower wall 51 of the bottom frame 23 is attached to the lower wall 36 of the front case 21. With this arrangement, the bottom frame 23 is attached to the front case 21, and the bottom wall 52 of the bottom frame 23 covers the second housing chamber R2 of the back cover 22.

The shield 24 is fitted into a groove 10j provided in the front face 10a, the top face 10c, and the front lower face 10f. The groove 10j and the shield 24 are attached to a substantially central part in the Y direction of the front case 21. The shield 24 has a front cover wall 55, an upper cover wall 56, and a lower cover wall 57.

The front cover wall 55 is substantially orthogonal to the Dj direction and forms a part of the front face 10a of the housing 10. The upper cover wall 56 is protruded in the −Dj direction from an end portion in the +Di direction of the front cover wall 55. The upper cover wall 56 is substantially orthogonal to the Di direction and forms a part of the top face 10c. The lower cover wall 57 is protruded in the −Dj direction from an end portion in the −Di direction of the front cover wall 55. The lower cover wall 57 is substantially orthogonal to the Di direction and forms a part of the front lower face 10f.

The spacer 25 is housed in the second housing chamber R2 and is attached, for example, to the bottom frame 23. The spacer 25 has an installation face 25a and a mounting face 25b. The mounting face 25b is one example of a second face. Note that the second face may be provided on a member different from the housing.

The installation face 25a is a face that is placed in an end portion in the −Z direction of the spacer 25 and that is substantially orthogonal to the Z direction. The installation face 25a is attached to the installation face 52b of the bottom wall 52, for example, by an adhesive. The installation face 25a is substantially in parallel with the installation face 52b of the bottom wall 52, the surface 100a of the object 100, and the attachment face 11c of the attachment 11.

The mounting face 25b forms a part of the inner face of the housing 10 and faces the inner side of the second housing chamber R2 provided inside the housing 10. In other words, the mounting face 25b is provided inside the housing 10. The mounting face 25b is a substantially flat face that faces a +Da direction inclined with respect to the Z direction, the Z direction being orthogonal to the attachment face 11c of the attachment 11. The mounting face 25b is inclined with respect to the attachment face 11c. In other words, the mounting face 25b is not vertical to the attachment face 11c and is not in parallel with the attachment face 11c.

The base portion 12 of the housing 10 includes the rear upper wall 42, the rear end wall 43, and the rear side wall 44 of the back cover 22, the bottom wall 52 of the bottom frame 23, and the spacer 25. The protruded portion 13 of the housing 10 includes the front wall 31 and the peripheral wall 32 of the front case 21, the rear wall 41 of the back cover 22, the front lower wall 51 of the bottom frame 23, the front cover wall 55 of the shield 24, the upper cover wall 56, and the lower cover wall 57. The first housing chamber R1 is provided inside the protruded portion 13, and the second housing chamber R2 is provided inside the base portion 12.

The vibration detecting device 1 includes a board assembly 60. The board assembly 60 includes a plurality of circuit boards 61, a plurality of electric components 62, and a flexible printed circuit board (FPC) 63. The FPC 63 is one example of a wiring component. Note that the number of circuit boards 61 included in the board assembly 60 may be one, or three or more. A wiring component is not limited to the FPC 63, and may be a different wiring component with flexibility such as a flexible flat cable or a plurality of cables.

Each of the circuit boards 61 is, for example, a printed circuit board (PCB). Note that the circuit boards 61 may be a different circuit board such as an FPC. The plurality of circuit boards 61 may include a plurality of kinds of circuit boards 61.

The plurality of circuit boards 61 is electrically connected to each other, for example, by a connector and is housed in the first housing chamber R1 provided inside the housing 10. Thus, the inner face 31a of the front wall 31 of the front case 21 faces the circuit boards 61. The peripheral wall 32 surrounds the circuit boards 61.

Each of the plurality of circuit boards 61 is formed in a substantially quadrangular plate shape substantially orthogonal to the Dj direction. Note that a circuit board 61 may be formed in a different shape such as a circle. The plurality of circuit boards 61 is arrayed in a thickness direction of each of the circuit boards 61 (Dj direction) with a gap.

In the present embodiment, the plurality of circuit boards 61 includes a circuit board 61A and a circuit board 61B. The circuit board 61A is closer to the rear wall 41 than the circuit board 61B. The circuit boards 61A and 61B have substantially identical sizes. Note that the plurality of circuit boards 61 may include a plurality of circuit boards 61 having different sizes.

Figure 5:
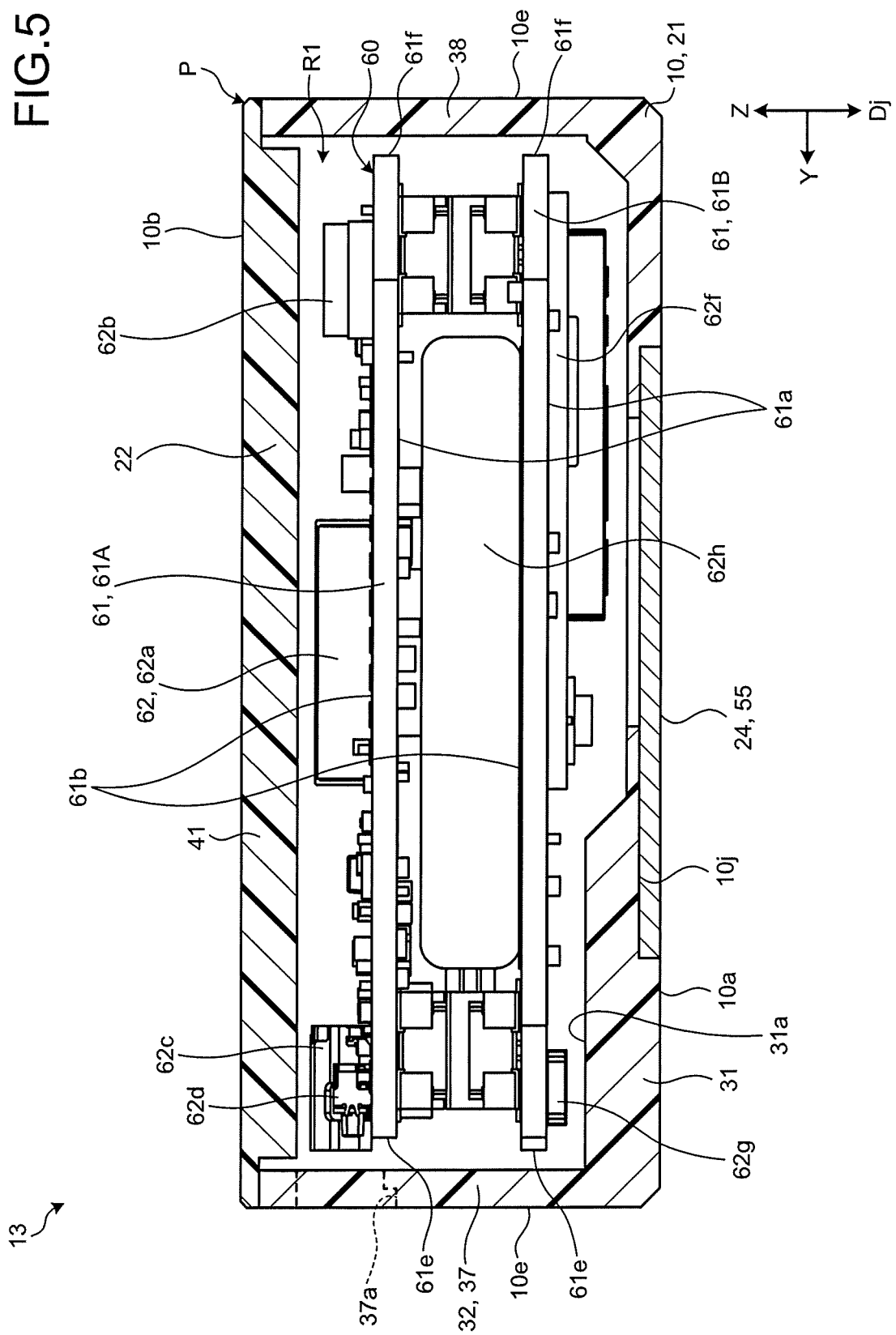
FIG. 5 is an exemplary sectional view illustrating the vibration detecting device along an F5-F5 line in FIG. 1, in the first embodiment.

FIG. 5 is an exemplary sectional view illustrating the vibration detecting device 1 along an F5-F5 in FIG. 1, in the first embodiment. As illustrated in FIG. 4 and FIG. 5, each of the circuit boards 61 has a front face 61a, a rear face 61b, an upper end 61c, a lower end 61d, a left end 61e, and a right end 61f. The rear face 61b of the circuit board 61A is one example of a third face.

The front face 61a is substantially flat and faces the +Dj direction. The rear face 61b is substantially flat and faces the −Dj direction. The −Dj direction is a direction inclined with respect to the Z direction. The rear face 61b is inclined with respect to the attachment face 11c of the attachment 11. In other words, the rear face 61b is not vertical to the attachment face 11c and is not in parallel with the attachment face 11c. The rear face 61b is placed on an opposite side of the front face 61a. The front face 61a of the circuit board 61A faces the rear face 61b of the circuit board 61B with a gap. The front face 61a of the circuit board 61B is placed on an opposite side of the rear face 61b of the circuit board 61A as a whole of the board assembly 60.

The upper end 61c is an end in the +Di direction of each of the circuit boards 61. The lower end 61d is an end in the −Di direction of each of the circuit boards 61. The lower end 61d is placed on an opposite side of the upper end 61c. The upper end 61c and the lower end 61d are extended in the Y direction.

The left end 61e is an end in the +Y direction of each of the circuit boards 61. The right end 61f is an end in the −Y direction of each of the circuit boards 61. The right end 61f is placed on an opposite side of the left end 61e. The left end 61e and the right end 61f are extended in the Di direction.

The electric components 62 include a micro controller unit (MCU) 62a, a first wireless unit 62b, an external connection connector 62c, an external operation switch 62d, a connector 62e, a second wireless unit 62f, an antenna 62g, and a battery 62h. The MCU 62a is one example of an electric component.

The MCU 62a, the first wireless unit 62b, the external connection connector 62c, the external operation switch 62d, and the connector 62e are mounted on the rear face 61b of the circuit board 61A. The MCU 62a is arranged in a substantially central part of the rear face 61b in the Y direction. The first wireless unit 62b is arranged in an end portion of the rear face 61b in the −Y direction. The external connection connector 62c and the external operation switch 62d are arranged in the end portion of the rear face 61b in the +Y direction. The connector 62e is arranged in an end portion of the rear face 61b in the −Di direction.

The second wireless unit 62f and the antenna 62g are mounted on the front face 61a of the circuit board 61B. The antenna 62g is arranged in an end portion in the +Y direction of the front face 61a. The battery 62h is mounted on the front face 61a of the circuit board 61A or the rear face 61b of the circuit board 61B.

The first wireless unit 62b includes an antenna and executes data communication, for example, according to a standard of Bluetooth (registered trademark) low energy (BLE). The second wireless unit 62f executes data communication by using the antenna 62g, for example, according to a standard of a long range wide area network (LoRaWAN) (registered trademark).

The external connection connector 62c and the external operation switch 62d are exposed to the outside of the housing 10 through the opening 37a of the housing 10. Note that the opening 37a may be covered with a cover or a different component. The external connection connector 62c and the external operation switch 62d are separated from the housing 10.

The first wireless unit 62b and the antenna 62g are covered with the front case 21 and the back cover 22 having electromagnetic wave transmittance. With this arrangement, a disturbance of wireless communication by the first wireless unit 62b and the antenna 62g is prevented.

On the one hand, the MCU 62a is covered with the shield 24 via the front case 21. With this arrangement an influence of a noise on the MCU 62a is reduced or prevented. Moreover, since the shield 24 is placed between the first wireless unit 62b and the antenna 62g in the Y direction, mutual interference between a communication signal of the first wireless unit 62b and a communication signal of the antenna 62g is reduced or prevented.

As illustrated in FIG. 4, the FPC 63 is connected to the circuit board 61A via the connector 62e. The FPC 63 is housed in the first housing chamber R1 and the second housing chamber R2 provided inside the housing 10. In other words, the FPC 63 is extended across the first housing chamber R1 and the second housing chamber R2.

The FPC 63 has flexibility and is bent and extended between the first end portion 63a and the second end portion 63b. The first end portion 63a includes one end in a longitudinal direction of the FPC 63 and a neighborhood part of the end. The second end portion 63b includes the other end in the longitudinal direction of the FPC 63 and a neighborhood part of the end.

The first end portion 63a is placed in the first housing chamber R1. The first end portion 63a is inserted into the connector 62e to be connected to the circuit board 61A. The second end portion 63b is placed in the second housing chamber R2.

The FPC 63 includes a first surface 63c and a second surface 63d. The first surface 63c and the second surface 63d face a thickness direction of the FPC 63. The second surface 63d is placed on an opposite side of the first surface 63c.

A terminal is provided in at least one of the first surface 63c and the second surface 63d in the first end portion 63a. When the terminal is connected to a terminal of the connector 62e, the FPC 63 is electrically connected to the circuit board 61A.

The vibration detecting device 1 further includes a vibration sensor (V.S.) 70. The vibration sensor 70 is mounted on the second end portion 63b of the FPC 63. In other words, the second end portion 63b is connected to the vibration sensor 70. Thus, the vibration sensor 70 is housed in the second housing chamber R2 provided inside the housing 10. The FPC 63 electrically connects the vibration sensor 70 and the circuit board 61A.

The vibration sensor 70 is, for example, a shock sensor. The shock sensor can detect vibration in three directions orthogonal to each other and outputs a detection signal corresponding to what is acquired by combination of the vibration in the three directions. Note that the vibration sensor 70 may be a different vibration sensor such as a piezoelectric vibration sensor, a micro electro mechanical systems (MEMS) vibration sensor, or a three-axis acceleration sensor.

Through the FPC 63, the vibration sensor 70 outputs a detection signal to the MCU 62a mounted on the circuit board 61A. The MCU 62a processes the detection signal of the vibration sensor 70, and controls the first wireless unit 62b and the second wireless unit 62f to perform wireless transmission of a signal based on the detection signal. Note that the MCU 62a is not limited to this example.

The vibration sensor 70 is attached to the mounting face 25b of the spacer 25, for example, with an adhesive or a sealant. The mounting face 25b is placed in the second housing chamber R2. That is, in the second housing chamber R2, an adhesive or a sealant surrounds and covers the vibration sensor 70 to fix that. Transmission of vibration through a part other than the mounting face 25b to the vibration sensor 70 is reduced or prevented by the surrounding adhesive or sealant.

Figure 6:
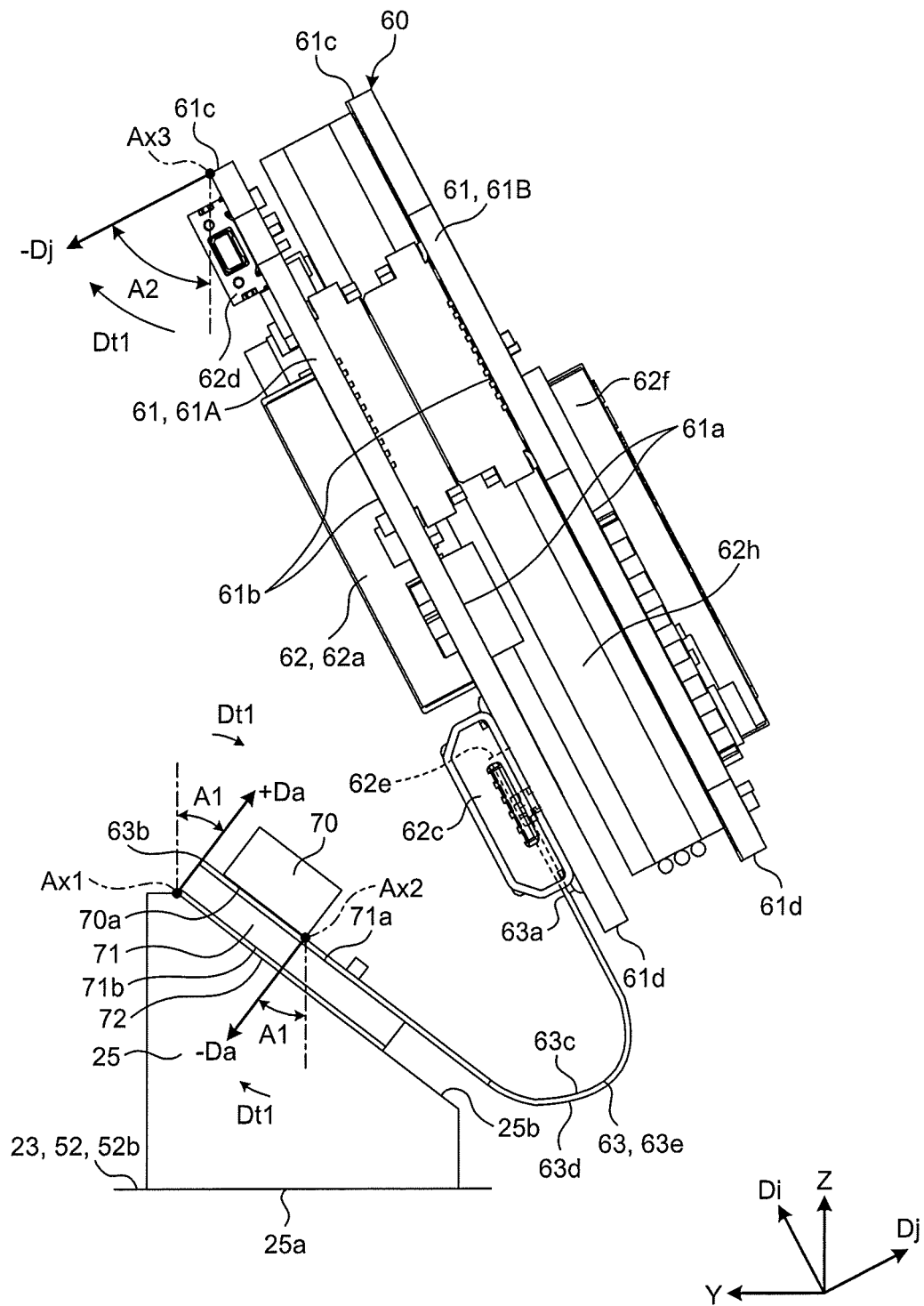
FIG. 6 is an exemplary side view illustrating a spacer, a board assembly, and a vibration sensor in the first embodiment.

FIG. 6 is an exemplary side view illustrating the spacer 25, the board assembly 60, and the vibration sensor 70 in the first embodiment. When described in detail with reference to FIG. 6, the vibration sensor 70 is mounted on the first surface 63c in the second end portion 63b of the FPC 63. A supporting member 71 is attached to the second surface 63d in the second end portion 63b of the FPC 63.

The supporting member 71 is formed of a material having a higher rigidity modulus than the FPC 63. For example, the supporting member 71 is a plate formed of a synthetic resin, metal, or a ceramic, or a PCB. The supporting member 71 has a fixed face 71a and a mounting face 71b.

The fixed face 71a is fixed to the second surface 63d of the FPC 63. The mounting face 71b is a substantially flat face that is placed on an opposite side of the fixed face 71a and that faces the mounting face 25b of the spacer 25. With an adhesive layer 72, the mounting face 71b is attached to the mounting face 25b of the spacer 25. The adhesive layer 72 is the above-described adhesive or sealant. Note that the adhesive layer 72 may be, for example, double-coated tape.

On the one hand, the vibration sensor 70 is formed in a substantially cuboid shape. Note that a shape of the vibration sensor 70 is not limited to this example. The vibration sensor 70 has a substantially flat bottom face 70a. The bottom face 70a is attached to the first surface 63c in the second end portion 63b of the FPC 63. For example, an electrode provided on the bottom face 70a is connected to an electrode provided on the first surface 63c by soldering. Moreover, the vibration sensor 70 may be fixed to the first surface 63c of the FPC 63, for example, with an adhesive or a sealant.

As described above, the bottom face 70a of the vibration sensor 70 of the present embodiment is attached to the mounting face 25b of the spacer 25 via the FPC 63, the supporting member 71, and the adhesive layer 72. The bottom face 70a of the vibration sensor 70 and the mounting face 25b of the spacer 25 face each other. The bottom face 70a of the vibration sensor 70, the first surface 63c and the second surface 63d of the FPC 63 in the second end portion 63b, the fixed face 71a and the mounting face 71b of the supporting member 71, and the mounting face 25b of the spacer 25 are substantially in parallel.

The bottom face 70a of the vibration sensor 70 is substantially flat. The bottom face faces a −Da direction inclined with respect to the Z direction, the Z direction being orthogonal to the attachment face 11c of the attachment 11. The −Da direction is an opposite direction of the +Da direction. The +Da direction and the −Da direction are in parallel with each other. The bottom face 70a is inclined with respect to the attachment face 11c of the attachment 11. In other words, the bottom face 70a is not vertical to the attachment face 11c and is not in parallel with the attachment face 11c.

The above-described attachment method is one example, and the vibration sensor 70 may be directly attached to the mounting face 25b of the spacer 25 with an adhesive or a sealant, for example. The bottom face 70a of the vibration sensor 70 and the mounting face 25b of the spacer 25 may not be in parallel with each other. That is, the +Da direction faced by the mounting face 25b of the spacer 25 and the −Da direction faced by the bottom face 70a of the vibration sensor 70 may not be in parallel.

The FPC 63 has one bent portion 63e that is bent between the first end portion 63a and the second end portion 63b. In other words, the FPC 63 is bent at one position between the first end portion 63a and the second end portion 63b. Thus, the FPC 63 is formed in a U shape substantially.

The FPC 63 is separated from the housing 10 at least in a neighborhood of the bent portion 63e. Thus, the FPC 63 has a changeable bent shape (such as position, or radius of curvature) in the bent portion 63e and controls transmission of vibration from the housing 10 to the vibration sensor 70 through the FPC 63.

As described above, the mounting face 25b of the spacer 25 faces the +Da direction inclined with respect to the Z direction, the Z direction being orthogonal to the attachment face 11c of the attachment 11. The bottom face 70a of the vibration sensor 70 faces the −Da direction inclined with respect to the Z direction. The rear face 61b of the circuit board 61A faces the −Dj direction inclined with respect to the Z direction. In the following, the +Da direction, the −Da direction, and the −Dj direction will be described in detail.

The +Da direction, the −Da direction, and the −Dj direction are inclined with respect to the Z direction on a common virtual plane orthogonal to the Y direction in a manner illustrated in FIG. 6. That is, the +Da direction, the −Da direction, the −Dj direction, and the Z direction are directions having no component in the Y direction. In other words, the +Da direction, the −Da direction, the −Dj direction, and the Z direction are directions orthogonal to the Y direction.

The +Da direction is inclined an acute first angle A1 with respect to the Z direction in a first inclination direction Dt1 around an axis Ax1, the axis Ax1 being orthogonal to the virtual plane. The axis Ax1 is one example of a first axis. The axis Ax1 is a virtual axis similarly to the virtual plane. The axis Ax1 is in parallel with the Y-axis. The first inclination direction Dt1 is one direction to rotate (to incline) around one axis. The first inclination direction Dt1 is one example of an inclination direction. In FIG. 6, the first inclination direction Dt1 is a clockwise direction. The mounting face 25b is inclined the acute first angle A1 with respect to the attachment face 11c of the attachment 11 in the first inclination direction Dt1 around the axis Ax1.

The −Da direction is inclined the acute first angle A1 with respect to the Z direction in the first inclination direction Dt1 around an axis Ax2, the axis Ax2 being orthogonal to the virtual plane. The axis Ax2 is one example of the first axis. The axis Ax2 is a virtual axis similarly to the virtual plane. The axis Ax2 is in parallel with the axis Ax1 and the Y-axis. The bottom face 70a is inclined the acute first angle A1 with respect to the attachment face 11c of the attachment 11 in the first inclination direction Dt1 around the axis Ax2.

An angle between the +Da direction (or −Da direction) and the Z direction includes the first angle A1 that is an acute angle, and an obtuse angle (180°−A1). That is, in other words, the +Da direction (or −Da direction) is inclined the obtuse angle (180°−A1) with respect to the Z direction in an opposite direction of the first inclination direction Dt1 around the axis Ax1 (or axis Ax2).

The −Dj direction is inclined an acute second angle A2 with respect to the Z direction in the first inclination direction Dt1 around an axis Ax3, the axis Ax3 being orthogonal to the virtual plane. The axis Ax3 is one example of a second axis. The axis Ax3 is a virtual axis similarly to the virtual plane. The axis Ax3 is in parallel with the axis Ax1, the axis Ax1, and the Y-axis. That is, the −Dj direction is inclined with respect to the Z direction in the clockwise direction in FIG. 6 (first inclination direction Dt1) similarly to the +Da direction and the −Da direction. The rear face 61b is inclined the acute second angle A2 with respect to the attachment face 11c of the attachment 11 in the first inclination direction Dt1 around the axis Ax3.

An angle between the −Dj direction and the Z direction includes the second angle A2 that is an acute angle, and an obtuse angle (180°−A2). That is, in other words, the −Dj direction is inclined the obtuse angle (180°−A2) with respect to the Z direction in an opposite direction of the first inclination direction Dt1 around the axis Ax3.

Each of the first angle A1 and the second angle A2 is larger than 0° and smaller than 90°. The first angle A1 is smaller than the second angle A2. The first angle A1 is 37.5° or 42.5°, for example. That is, the first angle A1 is smaller than 45°. Note that the first angle A1 and the second angle A2 are not limited to this example. For example, the first angle A1 may be larger than the second angle and larger than 45°.

Figure 7:
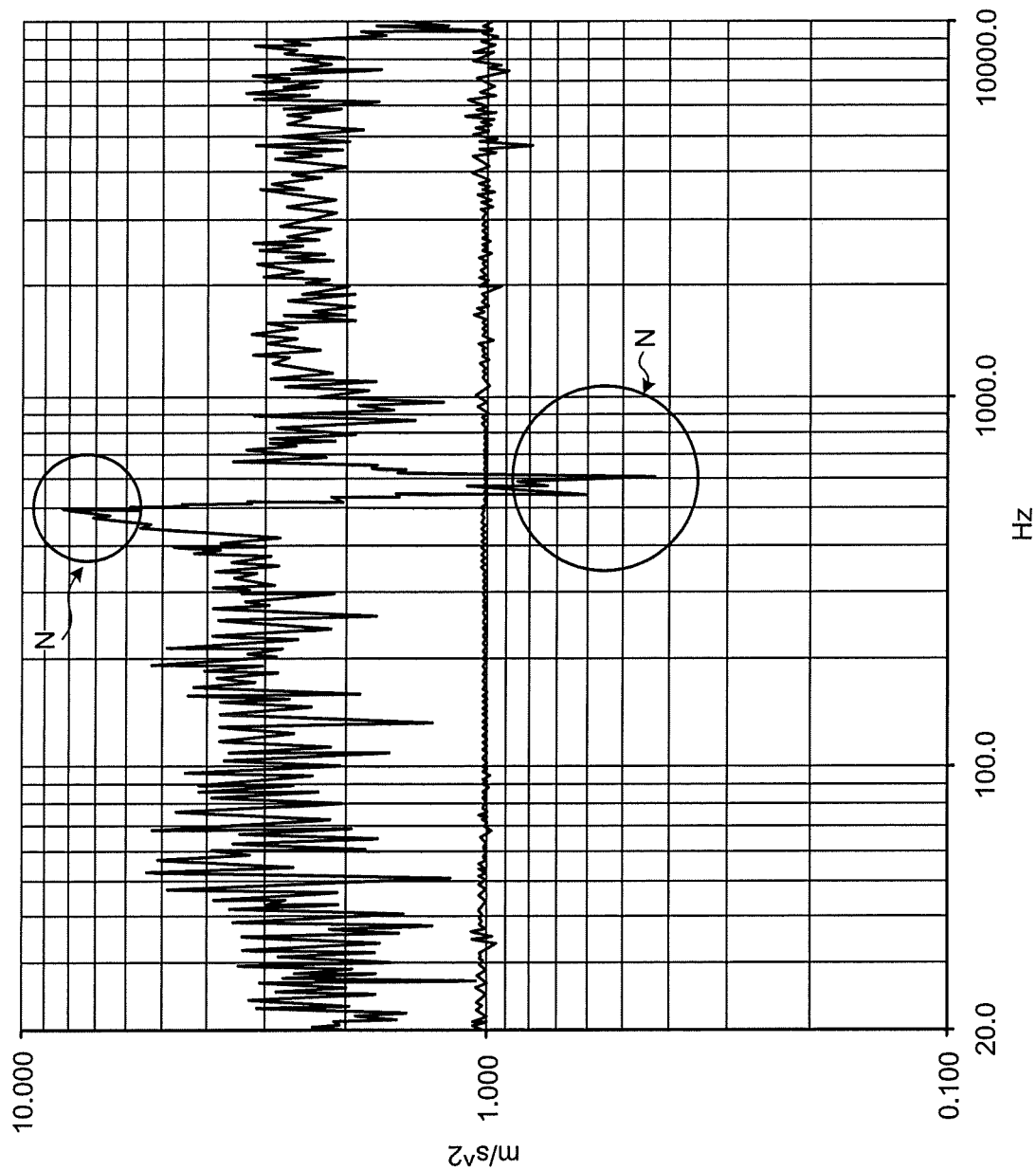
FIG. 7 is a graph illustrating a first example of a detection signal of the vibration sensor in the first embodiment.

FIG. 7 is a graph illustrating a first example of a detection signal of the vibration sensor 70 in the first embodiment. In FIG. 7, an example of a detection signal of the vibration sensor 70 of a case where the first angle A1 is 37.5° is illustrated.

Figure 8:
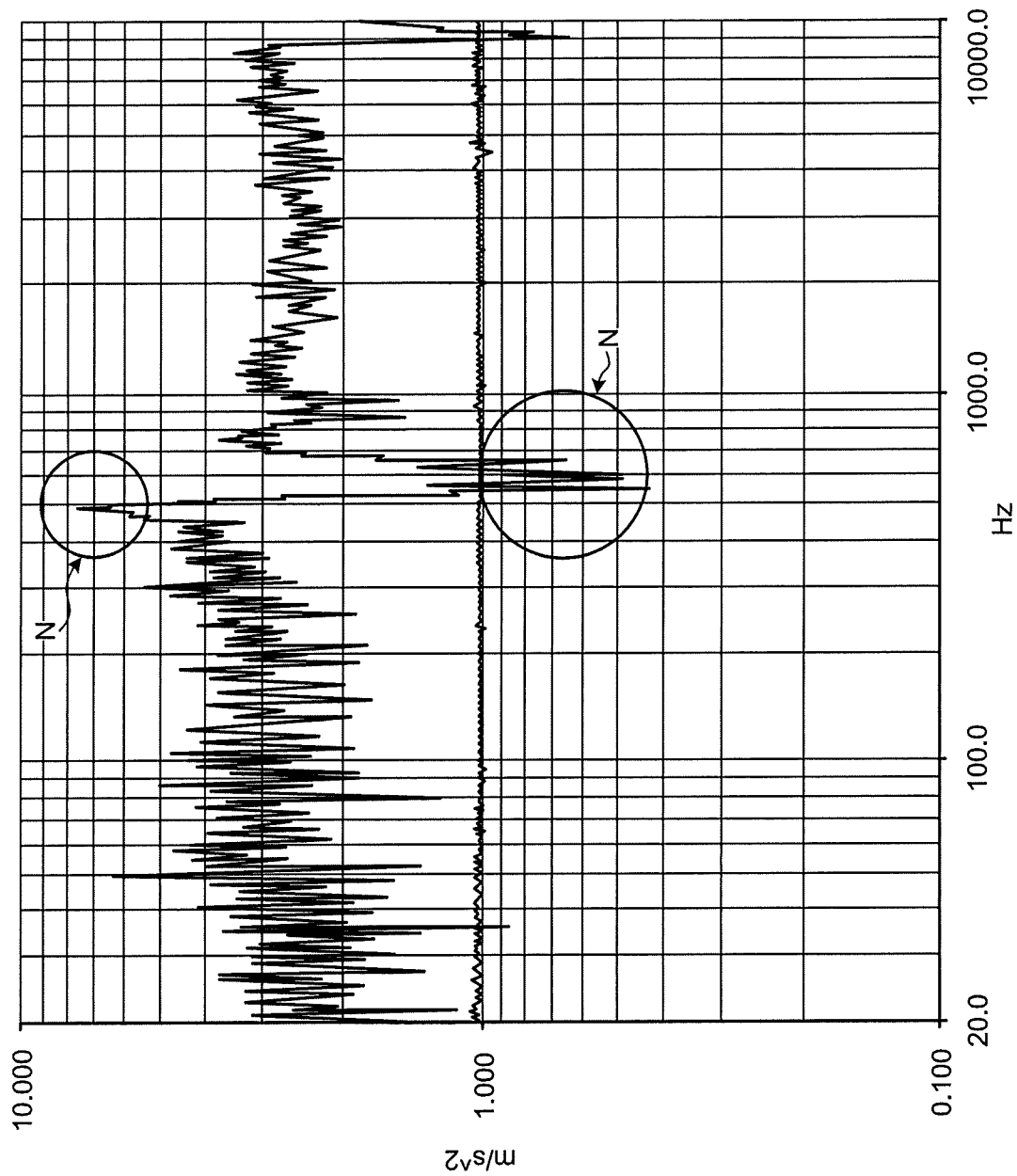
FIG. 8 is a graph illustrating a second example of a detection signal of the vibration sensor in the first embodiment.

FIG. 8 is a graph illustrating a second example of a detection signal of the vibration sensor 70 in the first embodiment. In FIG. 8, an example of a detection signal of the vibration sensor 70 of a case where the first angle A1 is 42.5° is illustrated.

Figure 9:
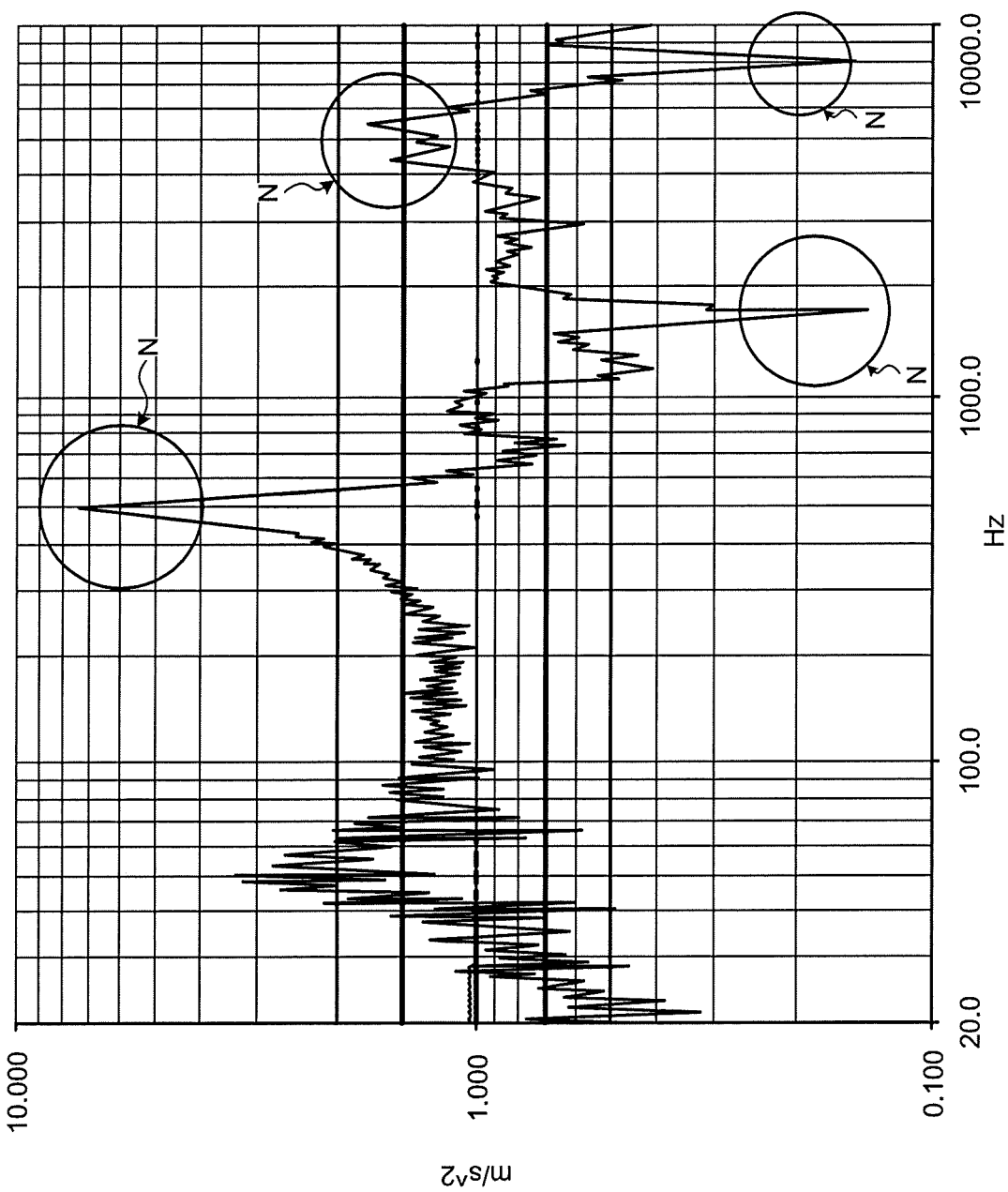
FIG. 9 is a graph illustrating an example of a detection signal of a vibration sensor as a comparison example.

FIG. 9 is a graph illustrating an example of a detection signal of a vibration sensor 70 as a comparison example. In FIG. 9, an example of a detection signal of the vibration sensor 70 of a case where a first angle A1 is 0° is illustrated. That is, in a vibration detecting device indicating the example of FIG. 9, a mounting face 25b is in parallel with an attachment face 11c of an attachment 11. In FIG. 7 to FIG. 9, a vertical axis indicates acceleration and a horizontal axis indicates a frequency.

By earnest research by the inventors, it is found that a resonant noise input into the vibration sensor 70 is reduced when the vibration sensor 70 is attached to the mounting face 25b facing the +Da direction inclined with respect to the Z direction orthogonal to the attachment face 11c. In other words, by earnest research by the inventors, it is found that a resonant noise input into the vibration sensor 70 is reduced when the bottom face 70a of the vibration sensor 70 is attached to the housing 10 in such a manner as to face the −Da direction inclined with respect to the Z direction orthogonal to the attachment face 11c. As illustrated in FIG. 7 to FIG. 9, many resonant noises N seen in the comparison example in FIG. 9 are reduced in the examples in FIG. 7 and FIG. 8 of the present embodiment.

By earnest research by the inventors, it is found that many acute first angles A1 between the Z direction and the +Da direction (−Da direction) in which directions the resonant noises N input into the vibration sensor 70 are reduced are distributed in a range smaller than 45°. As illustrated in FIG. 7 to FIG. 9, the resonant noises N are reduced in the examples of FIG. 7 and FIG. 8 in each of which examples the first angle A1 is smaller than 45°.

According to the first angle A1, a frequency band in which the resonant noises N are reduced varies. Thus, a plurality of kinds of spacers 25 with different first angles A1 may be prepared. By using a desired one of the plurality of kinds of spacers 25, it becomes possible to reduce a resonant noise N in a desired frequency band according to measurement environment.

As illustrated in FIG. 4, the attachment 11, the front case 21, the back cover 22, the bottom frame 23, and the shield 24 form a housing component P. The housing component P is one example of a first component. The housing component P houses the board assembly 60 including the plurality of circuit boards 61, and the vibration sensor 70.

A spacer 25 with which a first angle A1 becomes a desired angle can be attached to the bottom frame 23 of the housing component P. In this case, the housing component P, the board assembly 60, and the vibration sensor 70 are common regardless of a kind of the spacer 25. Thus, even when a plurality of manufacturing facilities (such as mold) to manufacture a plurality of kinds of spacers 25 is prepared, the number of manufacturing facilities to manufacture the housing component P, the board assembly 60, and the vibration sensor 70 is common.

In the vibration detecting device 1 according to the above-described first embodiment, the attachment face 11c configured to be attached to the object 100 is provided on the housing 10. The mounting face 25b is provided inside the housing 10 and is inclined with respect to the attachment face 11c. The vibration sensor 70 is attached to the mounting face 25b. By earnest research by the inventors, it is found that a resonant noise N input into the vibration sensor 70 is reduced when the vibration sensor 70 is attached to the mounting face 25b inclined with respect to the attachment face 11c. Thus, a trouble generated in the vibration detecting device 1 is reduced.

In other words, the housing 10 has the attachment face 11c. The mounting face 25b is provided inside the housing 10. The vibration sensor 70 has the bottom face 70a that is inclined with respect to the attachment face 11c and that is attached to the mounting face 25b. By earnest research by the inventors, it is found that a resonant noise N input into the vibration sensor 70 is reduced when the vibration sensor 70 is attached to the housing 10 in such a manner that the bottom face 70a is inclined with respect to the attachment face 11c. Thus, a trouble generated in the vibration detecting device 1 is reduced.

The vibration sensor 70 includes a shock sensor. By earnest research by the inventors, it is found that a resonant noise N input into the vibration sensor 70 is reduced when the vibration sensor 70 that is a shock sensor is attached to the mounting face 25b inclined with respect to the attachment face 11c. Thus, a trouble generated in the vibration detecting device 1 is reduced.

The circuit boards 61 have the rear face 61b inclined with respect to the attachment face 11c. The mounting face 25b is inclined with respect to the attachment face 11c around the axis Ax1. The rear face 61b is inclined with respect to the attachment face 11c around the axis Ax3, the axis Ax3 is in parallel with the axis Ax1. With this arrangement, a twist of the FPC 63 that connects the circuit boards 61 and the vibration sensor 70 attached to the mounting face 25b is reduced or prevented.

The mounting face 25b is inclined the acute first angle A1 with respect to the attachment face 11c in the first inclination direction Dt1 around the axis Ax1. The rear face 61b is inclined the acute second angle A2 with respect to the attachment face 11c in the above first inclination direction Dt1 around the axis Ax3. That is, the mounting face 25b and the rear face 61b are inclined for acute angles in the identical first inclination direction Dt1. With this arrangement, an inclination of the mounting face 25b and an inclination of the rear face 61b become close. Thus, it is possible to downsize the vibration detecting device 1.

The first angle A1 is smaller than the second angle A2. With this arrangement, interference with the circuit boards 61 by the vibration sensor 70 attached to the mounting face 25b is reduced or prevented. Moreover, assembling of the vibration detecting device 1 becomes easier.

The acute first angle A1 between the attachment face 11c and the mounting face 25b is smaller than 45°. By earnest research by the inventors, it is found that many acute first angles A1 between the attachment face 11c and the mounting face 25b in which directions a resonant noise N input into the vibration sensor 70 is reduced are distributed in a range smaller than 45°. Thus, the resonant noise N input into the vibration sensor 70 is reduced and a trouble generated in the vibration detecting device 1 is reduced.

The FPC 63 includes the first end portion 63a connected to the circuit boards 61, and the second end portion 63b connected to the vibration sensor 70. The FPC 63 is bent at one position between the first end portion 63a and the second end portion 63b. With this arrangement, it is possible to shorten the FPC 63.

The housing 10 includes the housing component P that houses the vibration sensor 70 and the circuit boards 61, and the spacer 25 that is attached to the housing component P and that has the mounting face 25b. With this arrangement, it is possible to set a +Da direction according to measuring environment by selectively attaching, to the common housing component P, a plurality of kinds of spacers 25 in which directions faced by mounting faces 25b (+Da direction) are different from each other, for example. That is, it is not necessary to prepare manufacturing facilities of a plurality of kinds of housing 10, and it is only necessary to prepare manufacturing facilities of a plurality of kinds of spacers 25 that is smaller. Thus, a cost can be reduced.

Second Embodiment

In the following, the second embodiment will be described with reference to FIG. 10. Note that in the following description of the embodiment, a reference sign which is the same as that of the already-described configuration element is assigned to a configuration element having a function similar to that of the already-described configuration element, and a description thereof may be omitted. In a plurality of configuration elements to which the same reference sign is assigned, all functions and properties are not necessarily common and different functions and properties corresponding to each embodiment may be included.

Figure 10:
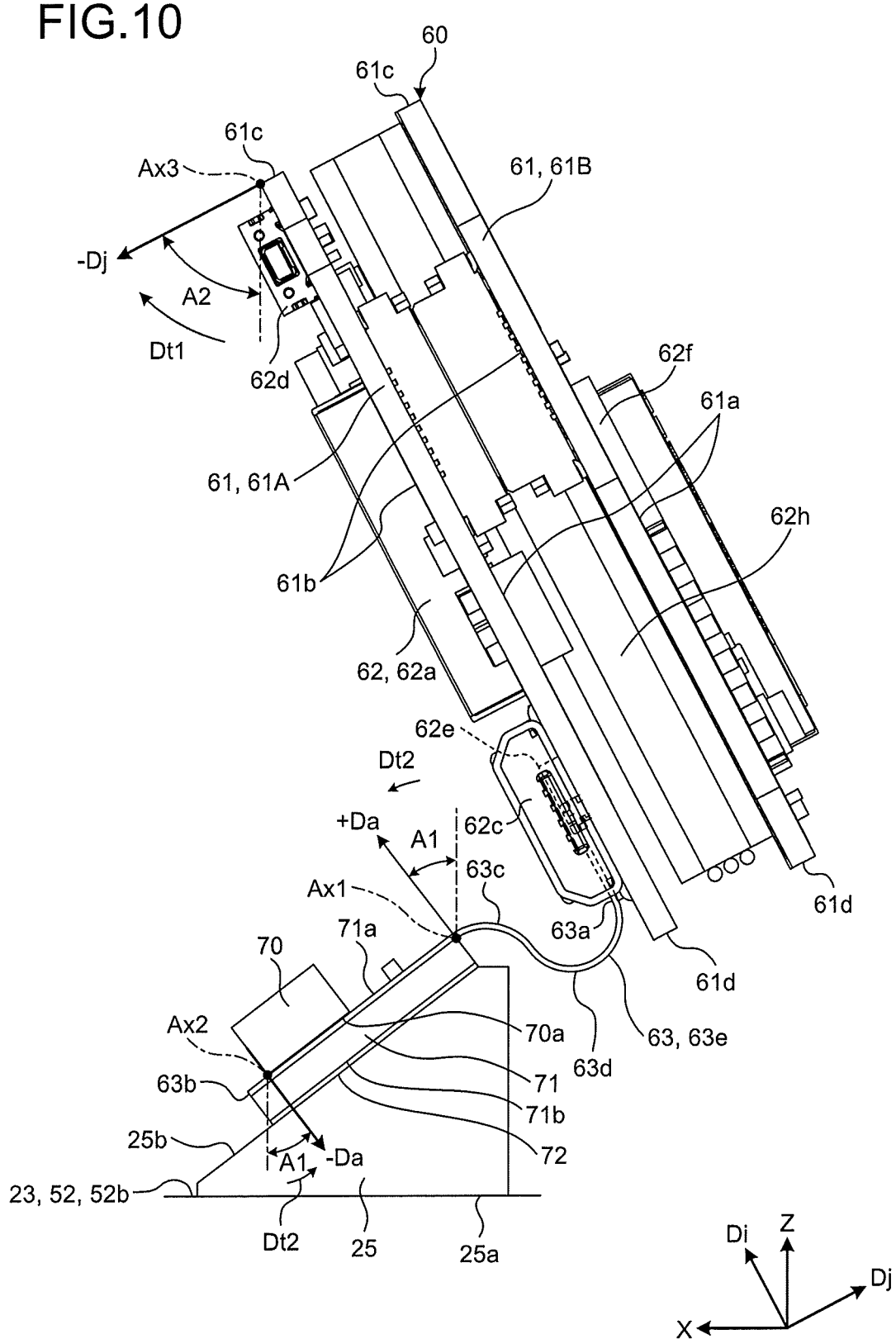
FIG. 10 is an exemplary side view illustrating a spacer, a board assembly, and a vibration sensor according to a second embodiment.

FIG. 10 is an exemplary side view illustrating a spacer 25, a board assembly 60, and a vibration sensor 70 according to the second embodiment. As illustrated in FIG. 10, in the second embodiment, a +Da direction is inclined with respect to a Z direction for an acute first angle A1 in a second inclination direction Dt2 around an axis Ax1. The second inclination direction Dt2 is one direction rotated (inclined) around one axis. In FIG. 10, the second inclination direction Dt2 is a counterclockwise direction. Similarly, a −Da direction is inclined with respect to the Z direction for the acute first angle A1 in the second inclination direction Dt2 around an axis Ax2. A mounting face 25b is inclined with respect to an attachment face 11c of an attachment 11 for the acute first angle A1 in the second inclination direction Dt2 around the axis Ax1. Moreover, a bottom face 70a is inclined with respect to the attachment face 11c of the attachment 11 for the acute first angle A1 in the second inclination direction Dt2 around the axis Ax2.

On the one hand, a −Dj direction is inclined with respect to the Z direction for the acute second angle A2 in the first inclination direction Dt1 around an axis Ax3 in a manner similar to the first embodiment. That is, the +Da direction and the −Da direction, and the −Dj direction are inclined with respect to the Z direction in the opposite directions.

In a manner of the above-described second embodiment, inclination directions with respect to the Z-axis (first inclination direction Dt1 and second inclination direction Dt2) may be different in the +Da direction and the −Da direction, and the −Dj direction. A virtual plane formed by the +Da direction and the −Da direction, and the Z direction may be different from a virtual plane formed by the −Dj direction and the Z direction. A rear face 61b of a circuit board 61A may face an X direction, a Y direction, or the Z direction.

In the above plurality of embodiments, a spacer 25 is a component different from a housing component P. However, the spacer 25 may be formed integrally with a bottom frame 23 of a housing component P, for example. With this arrangement, the number of components is reduced, and a cost of a vibration detecting device 1 can be reduced. In the above embodiments, an attachment face 11c that is one example of a first face and a mounting face 25b that is one example of a second face are a part of a housing 10. However, as long as being provided in a housing, a first face may be formed of a material different from that of the housing. As long as being provided inside the housing, the second face may be formed of a material different from that of the housing.

According to at least one embodiment described above, a first face configured to be attached to an object is provided on a housing. A second face is provided inside the housing and is inclined with respect to the first face, a vibration sensor being attached thereto. By earnest research by the inventors, it is found that a resonant noise input into the vibration sensor is reduced when the vibration sensor is attached to the second face inclined with respect to the first face. Thus, a trouble generated in a vibration detecting device is reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A vibration detecting device comprising:
a housing;
a vibration sensor in the housing;
a circuit board in the housing, the circuit board on which an electric component that processes a detection signal of the vibration sensor is provided;
a flexible wiring component that electrically connects the vibration sensor and the circuit board;
a first face provided on the housing, the first face configured to be attached to an object; and
a second face provided inside the housing and inclined with respect to the first face, the second face to which the vibration sensor is attached, wherein
the circuit board has a third face on which the electric component is mounted, the third face inclined with respect to the first face, and
an angle between the first face and the second face is different from an angle between the first face and the third face.

2. The vibration detecting device according to claim 1, wherein
the vibration sensor includes a shock sensor.

3. The vibration detecting device according to claim 1, wherein
the second face is inclined with respect to the first face around a first axis, and
the third face is inclined with respect to the first face around a second axis that is in parallel with the first axis.

4. The vibration detecting device according to claim 3, wherein
the second face is inclined an acute first angle with respect to the first face in an inclination direction around the first axis, and
the third face is inclined an acute second angle with respect to the first face in the inclination direction around the second axis.

5. The vibration detecting device according to claim 4, wherein
the first angle is smaller than the second angle.

6. The vibration detecting device according to claim 1, wherein
an acute angle between the first face and the second face is smaller than 45°.

7. The vibration detecting device according to claim 1, wherein
the wiring component has a first end portion connected to the circuit board, and a second end portion connected to the vibration sensor and is bent at one position between the first end portion and the second end portion.

8. The vibration detecting device according to claim 1, wherein
the housing includes a first component that houses the vibration sensor and the circuit board, and a second component that is attached to the first component and that has the second face.

9. A vibration detecting device comprising:
a housing;
a first face provided on the housing, the first face configured to be attached to an object;
a second face provided inside the housing;
a vibration sensor in the housing, the vibration sensor including a bottom face inclined with respect to the first face and attached to the second face;
a circuit board in the housing, the circuit board on which an electric component that processes a detection signal of the vibration sensor is provided; and
a flexible wiring component that electrically connects the vibration sensor and the circuit board, wherein
the circuit board has a third face on which the electric component is mounted, the third face inclined with respect to the first face, and
an angle between the first face and the bottom face is different from an angle between the first face and the third face.

10. The vibration detecting device according to claim 9, wherein
the vibration sensor includes a shock sensor.

11. The vibration detecting device according to claim 9, wherein
the bottom face is inclined with respect to the first face around a first axis, and
the third face is inclined with respect to the first face around a second axis that is in parallel with the first axis.

12. The vibration detecting device according to claim 11, wherein
the bottom face is inclined an acute first angle with respect to the first face in an inclination direction around the first axis, and
the third face is inclined an acute second angle with respect to the first face in the inclination direction around the second axis.

13. The vibration detecting device according to claim 12, wherein
the first angle is smaller than the second angle.

14. The vibration detecting device according to claim 9, wherein
an acute angle between the first face and the bottom face is smaller than 45°.

15. The vibration detecting device according to claim 9, wherein
the wiring component has a first end portion connected to the circuit board, and a second end portion connected to the vibration sensor and is bent at one position between the first end portion and the second end portion.

16. The vibration detecting device according to claim 9, wherein
the housing includes a first component that houses the vibration sensor and the circuit board, and a second component that is attached to the first component and that has the second face.

17. A vibration detecting device comprising:
a housing;
a vibration sensor in the housing;
a circuit board in the housing, the circuit board on which an electric component that processes a detection signal of the vibration sensor is provided;
a flexible wiring component that electrically connects the vibration sensor and the circuit board;
a first face provided on the housing, the first face configured to be attached to an object; and a second face provided inside the housing and inclined with respect to the first face, the second face to which the vibration sensor is attached, wherein the housing includes:
- a first component that houses the vibration sensor and the circuit board; and
- a second component that is attached to the first component and that has the second face and a third face, and the third face is attached to the first component and is inclined with respect to the second face.

* * * * *